United States Patent
Erlebach et al.

[11] Patent Number: 5,524,738
[45] Date of Patent: Jun. 11, 1996

[54] JAW CLUTCH HAVING PROFILED JAW CLUTCH ELEMENTS

[75] Inventors: Friedrich Erlebach, Steyr; Josef Leitner, Kollerschlag, both of Austria

[73] Assignee: Steyr-Daimler-Puch Aktiengesellschaft, Vienna, Austria

[21] Appl. No.: 450,368

[22] Filed: May 25, 1995

[30] Foreign Application Priority Data

May 31, 1994 [AT] Austria ................................ 1116/94

[51] Int. Cl.$^6$ ............................................. F16D 11/10
[52] U.S. Cl. ............................... 192/69.83; 192/108
[58] Field of Search ................. 192/69.8, 69.83, 192/108, 114 T

[56] References Cited

U.S. PATENT DOCUMENTS

| | | | |
|---|---|---|---|
| 2,384,584 | 9/1945 | Wildhaber | 192/108 X |
| 2,388,456 | 11/1945 | Wildhaber | 192/108 X |
| 2,535,388 | 12/1950 | Burks et al. | 192/108 X |
| 2,654,456 | 10/1953 | Wildhaber | 192/69.83 X |
| 3,043,414 | 7/1962 | Peras | 192/108 X |
| 3,550,738 | 12/1970 | Halibrand | 192/108 X |
| 4,566,566 | 1/1986 | Vuillet | 192/69.83 X |

*Primary Examiner*—Andrea L. Pitts
*Attorney, Agent, or Firm*—Bachman & LaPointe

[57] ABSTRACT

A jaw clutch for the drive of motor vehicles has a first clutch half and a second clutch half which are axially displaceable relative to one another, both clutch halves are provided with axially protruding jaw elements which are distributed uniformly over the contact surface of the halves. In order to engage the clutch halves without synchronization and at the greatest possible difference in speed of rotation in an easy and rapid manner, the jaw elements are provided with transition zones from the front surface and side surfaces of the jaw element which are curved as seen in circumferential section wherein the radius of curvature is 6 to 13%, and the length of curvature in circumferential direction is 3 to 7% the average jaw radius.

7 Claims, 3 Drawing Sheets

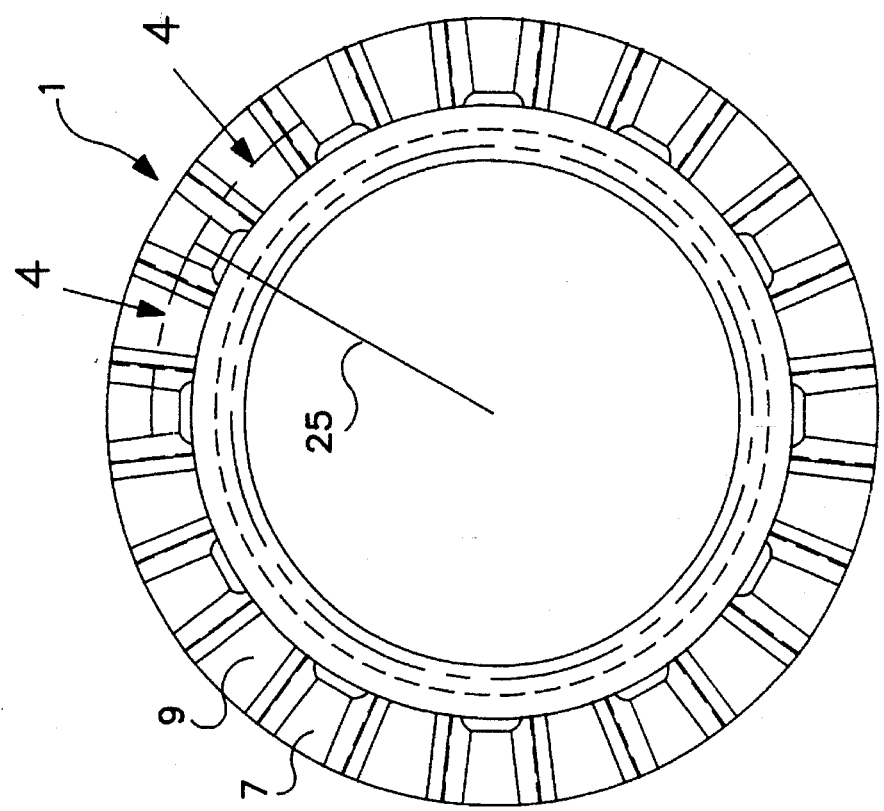
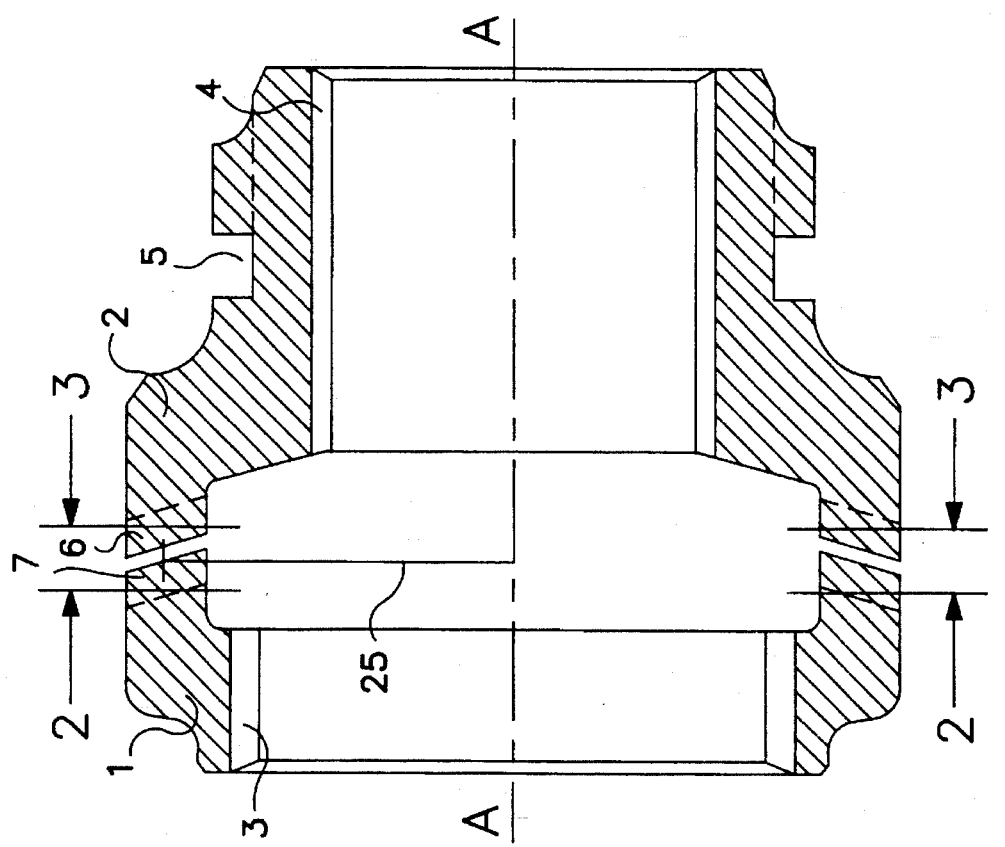
FIG. 2
FIG. 1

5,524,738

JAW CLUTCH HAVING PROFILED JAW CLUTCH ELEMENTS

BACKGROUND OF THE INVENTION

The present invention relates to jaw clutches for the drive of a motor vehicle in which a first clutch half is connected to a first wheel drive line and a second clutch half is connected to a main drive line and a second wheel drive line wherein one of the two clutch halves is selectively axially displaceable relative to the other and wherein each of the clutch halves has axially protruding from a contact surface thereof a plurality of profiled jaw clutch elements which are distributed uniformly in spaced relationship over the contact surface.

Jaw clutches are used in distributor gears or differential gears as described in EP-OS 510 457. The distributor gears can be either with a central differential or without a central differential. In the former case, the clutches in question serve as a differential lock and in the second case they serve to connect the front axle drive. As used herein, differential gears is understood to mean, in particular, axle differential gears or intermediate differential gears in vehicles having tandem axles in which case the clutches in question serve as a transverse lock.

In the application described above, under good road conditions, if neither locks nor front axle drives are connected, only slight differences in speed of rotation are present between the clutch halves. Upon worsening road conditions, the difference in speed of rotation between the clutch halves increases, which leads to connection or locking. Whether actuated manually or automatically, as long as the difference in speed of rotation does not exceed certain limit values, the jaw clutch can be switched without synchronization. In the case of the gears described in EP-OS 510 457, the engagement of the clutch is effected by an automatic control and it is possible to leave the disengagement of the clutch to a spring which operates when the torque drops below a predetermined value.

It is desirable that the range of speeds of rotation at which the jaw clutch can be engaged be sufficiently large so as to allow for the engagement to take place as fast and free of friction as possible. The foregoing saves time during which the vehicle would otherwise lose momentum or come entirely to a stop.

U.S. Pat. No. 3,550,738 discloses jaw clutches having jaw clutch elements the front surfaces of which are curved or rounded, as seen in circumferential section, specifically for the purpose described above. The curved surface extends over the entire front surface of the jaw clutch elements and are intended, upon engagement with difference in speed of rotation of the two clutch halves, to bump past each other with friction and thus reduce the difference in speed of rotation. This friction means wear, noise and loss of time. Furthermore, when using a jaw clutch in the drive line of a vehicle, in which, after all, neither of the clutch parts rotates freely (the two are coupled by the road more or less rigidly to each other), the torques are so great that synchronization by such friction is not possible.

Federal Republic of Germany OS 41 38 917 discloses a jaw clutch having a profile consisting of circular arcs. In the case of this clutch, the jaws are held continuously in engagement by a spring which urges the clutch in closing direction, and they can be disengaged under full load. With the arcuate profile, no edge pressure occurs during the disengagement of the clutch halves.

Undercut jaw elements are known from Federal Republic of Germany OS 37 30 889 which discloses clutches which are switched positively in both directions.

It is the principle object of the present invention to provide a jaw clutch which can be engaged quickly, reliably, and with low wear, over a sufficiently large range of differences in speeds of rotation.

SUMMARY OF THE INVENTION

The foregoing object is achieved by way of the present invention wherein each clutch half is provided with clutch engagement means which comprise a plurality of profiled jaw clutch elements uniformly distributed in spaced relationship on the contact surface of each clutch half, each of the plurality of profiled jaw clutch elements has a front surface and a pair of side surfaces. The front surface comprises a substantially flat central surface between a pair of curved surfaces each having a length and radius of curvature. The curved surfaces form a transition zone between the flat central surface and the pair of side surfaces, the curved surface and each of the side surfaces joining to form a sharp edge. The radius of curvature and length of each of the curved surfaces is between about 5 to 16% and 3 to 10%, respectively, of the average jaw radius, where the jaw radius is the average distance of the jaws from the axis of rotation. By designing the profiled jaw clutch elements as aforesaid, the engagement of the clutch in the desired range of differences in speeds of rotation is possible while, at the same time, insuring long life. In accordance with the invention, by providing sharp edges, the jaws are, under the action of the engagement force, within one another for the shortest time, even during different speeds of rotations. In other words, the curvature and the length of the front surface of the profiled jaw elements are so selected that the jaws of the clutch half which is accelerated in the direction of engagement (in axial direction) slip as free of friction as possible past the jaws of the other clutch half. In accordance with the invention, the front surface and the side surfaces form an edge having a desired obtuse angle which prohibits the wearing off of the edges of the jaws.

It has been found by experiment that particularly good results are obtained if the radius of curvature and the length of the curved surface is preferably between 9 and 11% and between 5 and 7%, respectively, of the average jaw radius.

In accordance with a further feature of the invention, the side or flank surfaces can be undercut by about 10°, as seen in circumferential section, with respect to a line normal to the flat central surface of the front surface. In this way, on one hand, a favorable contact is obtained and, on the other hand, assurance is had that the clutch can be reliably and fully engaged and, once the jaws have been engaged, they will no longer jump apart.

BRIEF DESCRIPTION OF THE DRAWINGS

The invention will be described below in further detail with reference to the drawings, in which:

FIG. 1 shows an embodiment of the clutch in accordance with the invention, seen in longitudinal section, in disengaged condition;

FIG. 2 is an end view along the line 2—2 of FIG. 1;

DETAILED DESCRIPTION

Figure 3:
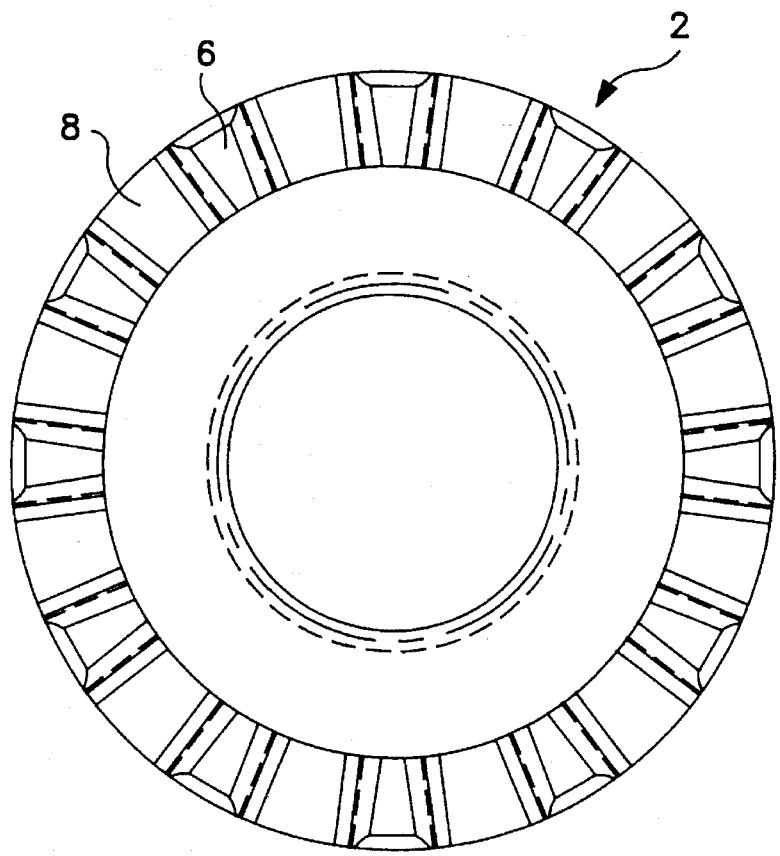
FIG. 3 is an end view along the line 3—3 of FIG. 1.

With reference to FIGS. 1, 2 and 3, a first clutch half 1 and a second clutch half 2 are axially aligned along axis A. The two halves are connected and fixed for rotation by means of splines 3 and 4 to shafts or other drive parts (not shown). As illustrated, the second clutch half 2 is axially displaceable. For this purpose, clutch half 2 is provided with a circumferential groove 5 for engagement by a gearshift fork (not shown). The second clutch half 2 has on the contact surface thereof a plurality of profiled jaws 6 uniformly distributed in spaced relationship and the first clutch half 1 has the same number of corresponding jaws 7. The spaces between the jaws 6 and 7 are designated by reference numbers 8 and 9.

Figure 4:
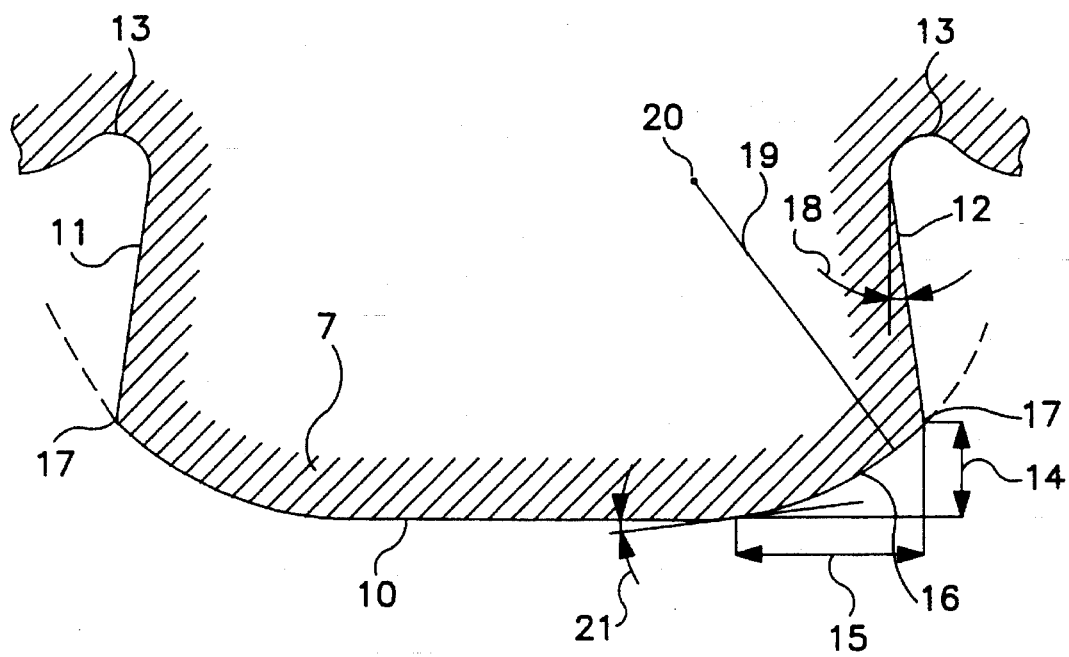
FIG. 4 is a circumferential cross section along the line 4—4 in FIG. 2, shown enlarged.

The profiles of the jaw clutch elements 6 and 7, as seen in circumferential section in FIGS. 2 and 3, are formed as follows: With reference to FIG. 4, each profiled jaw clutch element has a front surface 10 and a pair of side surfaces 11 and 12. The front surface 10 comprises a flat central surface between a pair of curved surfaces 16. The curved surfaces 16 form a transition zone between the flat central surface of front surface 10 and the side surfaces 11 and 12. Curved surfaces 16 join to the side surfaces 11 and 12 to form a sharp edge 17. Side surfaces 11 and 12 lie substantially perpendicular to the flat central surface of front surface 10. Preferably, the side surfaces 11 and 12 are undercut with respect to front surface 10 and form an angle 18 with respect to a line normal to the front surface of about 10°. The transition 13 between the side surfaces 11 and 12 and the spaces 8 between profiled jaws 6 and 7 is rounded so as to reduce notch stresses.

In order to achieve the objects of the invention the profiled jaw elements must be of a specific geometrical construction. The curved surface 16 extends over a circumferential distance 15 from the edge 17 (which is set backward in axial direction from the front surface 10 by a relief 14) and intersects the flat central surface of front surface 10 at a transition angle 21 of about 5°. The radius of curvature of curved surface 16 is 5 to 16% of the average jaw radius, and preferably 9 to 11%. The circumferential length 15 of the curved surface 16 is 3 to 10%, preferably 5 to 6%, the average jaw radius. By average jaw radius is meant the radius 25 as shown in FIGS. 1 and 2 from the axis A to the center line of the jaw elements 6 and 7, that is, the average distance of the jaws from the axis of rotation. If curved surface 16 has a radius of curvature greater than described above, there is the danger that the angle formed by the side surfaces 11 and 12 with the front surface 10 at the edges 17 will be too small which will result in the edges breaking off.

The radius of curvature 19 of the curved surface 16 is critical. It can be considered the radius of the osculating circle of a parabola which describes a point of the clutch half, which clutch half is accelerated under the action of the engagement force, in case of a given difference in circumferential speed as compared with the other clutch half. To this extent, a parabola would be preferable to the circle, but for reasons of manufacture a circle is preferred. This difference in circumferential speed corresponds to the difference in the speed of rotation at which the clutch may still be engaged or disengaged, i.e. in practice about 300 rpm. The axial relief 14 can be selected arbitrarily, but it should not be selected too large since it is obtained at the expense of the supporting surface of the side surfaces 11 and 12. The position of the center 20 of the circle is determined with the circumferential length 15 of curved surface 16 at which the arc intersects the front surface 10 at an angle 21 of about 5°. The circumferential length 15 is independent of the length of the jaw in circumferential direction. For reasons of strength, the latter will always be substantially greater than the former, so that the flat central surface of the front surface remains between the curved surfaces 16.

In the case of higher differences in speed of rotation and small engagement forces there is a certain danger that the jaws will not pass entirely into the spaces in the axial direction. In such case, the side surfaces overlap each other only slightly, and this could lead to the destruction of the jaws. This can be counteracted by side surfaces which are undercut by an angle 18 of about 10° and a sharp edge 17, if enlargement of the circumferential clearance between the jaws of the two clutch parts is not sufficient.

Figure 5:
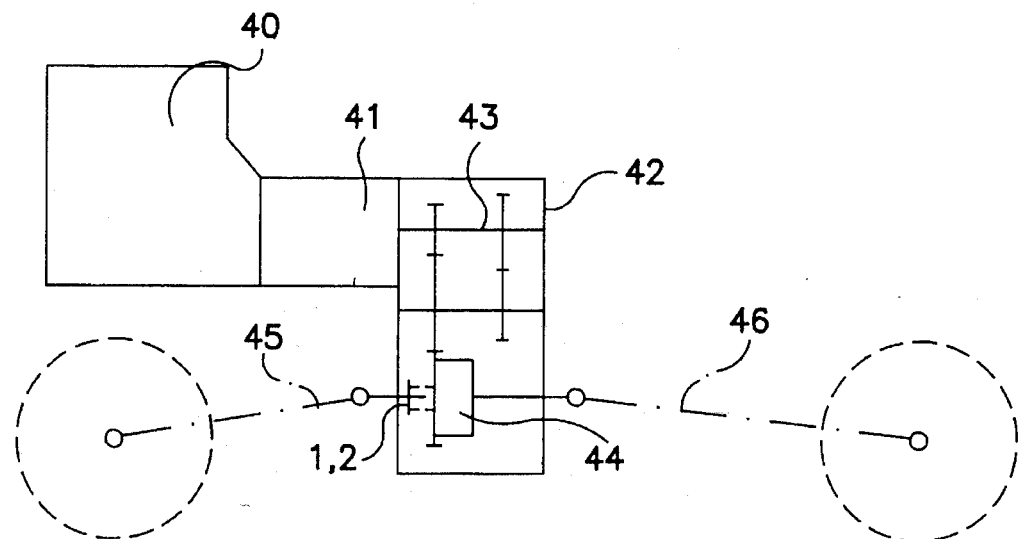
FIGS. 5, 6 and 7 show three different applications of the clutch of the invention in the drive line of a motor vehicle.

In FIG. 5, the drive train of a truck consists of a motor with main clutch 40, a transmission 41, and a distributor gear 42 with the input shaft 43. This forms the main drive line. The distributor gear has a longitudinal differential 44 from which a first wheel drive line 45 leads to the front axle and a second wheel drive line 46 leads to the rear axle. For the locking of the longitudinal differential, a jaw clutch 1 and 2 in accordance with the invention is arranged between the differential and the first (in this figure) or the second wheel drive line.

Figure 6:
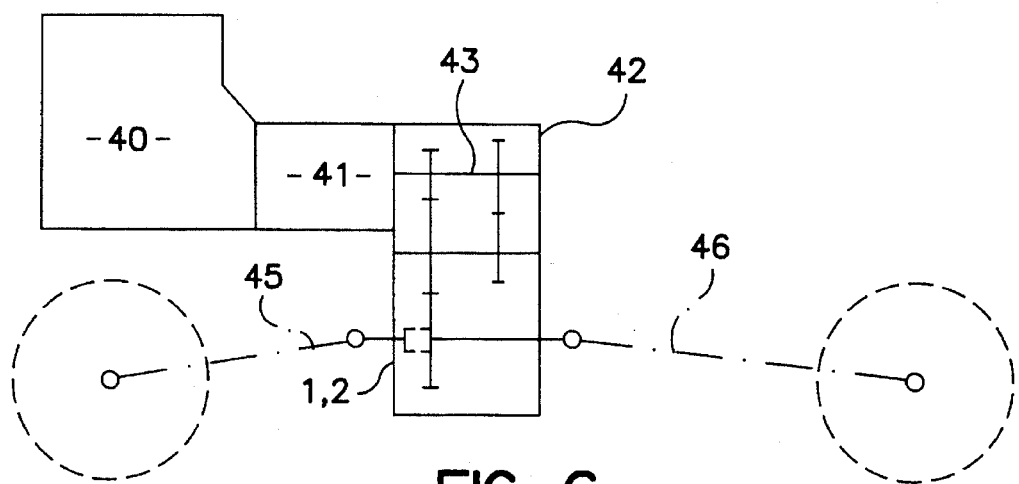

FIG. 6 differs from FIG. 5 only by the fact that the distributor gear does not have a longitudinal differential, but the first wheel drive line 45 can be connected by means of the jaw clutch 1 and 2 of the invention.

Figure 7:
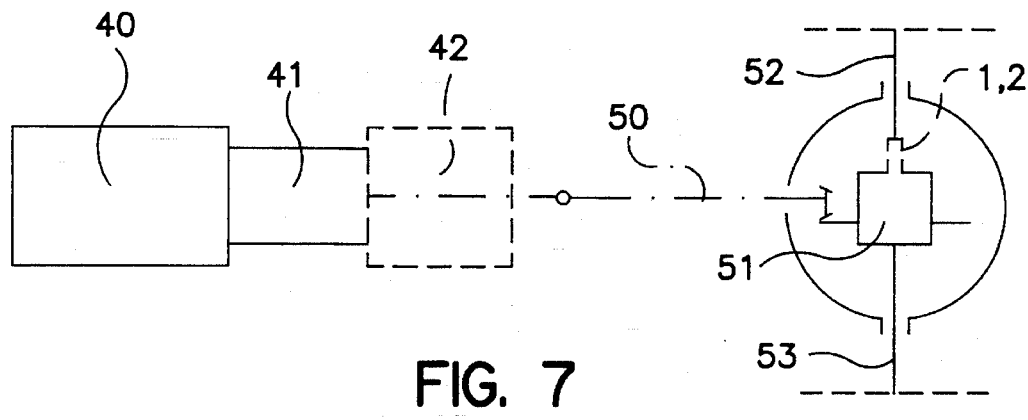

In FIG. 7, a distributor gear 42 may or may not be used. The drive shaft 50 to an axle, in this case the rear axle, forms here the main drive line which leads to an axle differential. 51. 52 and 53 are first and second wheel drive lines. By connecting one of the two drive lines 52 and 53 with the differential 51 by means of the clutch 1 and 2 of the invention, the axle differential can be locked.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A jaw clutch for the drive of a motor vehicle comprising:
    a first clutch half and a second clutch half axially aligned along an axis, said first clutch half being connected to a first wheel drive line of said motor vehicle and said second clutch half being connected to a main drive line and a second wheel drive line of said motor vehicle;
    said first clutch half and said second clutch half each being provided with a jaw clutch means on a contact surface thereof, said clutch halves each having an average jaw radius;
    means for axially displacing one of said first clutch half and said second clutch half along said axis for selectively engaging and disengaging said jaw clutch means;
    said jaw clutch means comprises a plurality of profiled jaw clutch elements uniformly distributed in spaced relationship on said contact surface of each clutch half, each of said plurality of profiled jaw clutch elements has a front surface and a pair of side surfaces, said front surface comprises a substantially flat central surface between a pair of curved surfaces each having a length and radius of curvature wherein said curved surfaces form a transition zone between said flat central surface and said pair of side surfaces wherein said radius of curvature and length of each of said curved surfaces is between about 5 to 16% and 3 to 10%, respectively, the average jaw radius.

2. A jaw clutch according to claim 1 wherein the radius of curvature and length is between about 9 to 11% and 5 to 7%, respectively, the average jaw radius.

3. A jaw clutch according to claim 1 wherein the side surfaces are undercut with respect to said front surface so as to form an angle of about 10° with respect to a line normal to said flat central surface.

4. A jaw clutch according to claim 1 wherein said curved surfaces and said side surfaces join to form a sharp edge.

5. A jaw clutch according to claim 1 wherein the curved surfaces intersect the flat central surface at a transition angle of about 21°.

6. A distributor having a jaw clutch comprising:

a first clutch half and a second clutch half axially aligned along an axis, said first clutch half being connected to a first wheel drive line of said motor vehicle and said second clutch half being connected to a main drive line and a second wheel drive line of said motor vehicle;

said first clutch half and said second clutch half each being provided with a jaw clutch means on a contact surface thereof, said clutch halves each having an average jaw radius;

means for axially displacing one of said first clutch half and said second clutch half along said axis for selectively engaging and disengaging said jaw clutch means;

said jaw clutch means comprises a plurality of profiled jaw clutch elements uniformly distributed in spaced relationship on said contact surface of each clutch half, each of said plurality of profiled jaw clutch elements has a front surface and a pair of side surfaces, said front surface comprises a substantially flat central surface between a pair of curved surfaces each having a length and radius of curvature wherein said curved surfaces form a transition zone between said flat central surface and said pair of side surfaces, said curved surfaces and said side surfaces joining to form a sharp edge wherein said radius of curvature and length of each of said curved surfaces is between about 5 to 16% and 3 to 10%, respectively, the average jaw radius.

7. An axle differential gear having a jaw clutch comprising:

a first clutch half and a second clutch half axially aligned along an axis, said first clutch half being connected to a first wheel drive line of said motor vehicle and said second clutch half being connected to a main drive line and a second wheel drive line of said motor vehicle;

said first clutch half and said second clutch half each being provided with a jaw clutch means on a contact surface thereof, said clutch halves each having an average jaw radius;

means for axially displacing one of said first clutch half and said second clutch half along said axis for selectively engaging and disengaging said jaw clutch means;

said jaw clutch means comprises a plurality of profiled jaw clutch elements uniformly distributed in spaced relationship on said contact surface of each clutch half, each of said plurality of profiled jaw clutch elements has a front surface and a pair of side surfaces, said front surface comprises a substantially flat central surface between a pair of curved surfaces each having a length and radius of curvature wherein said curved surfaces form a transition zone between said flat central surface and said pair of side surfaces, said curved surfaces and said side surfaces joining to form a sharp edge wherein said radius of curvature and length of each of said curved surfaces is between about 5 to 16% and 3 to 10%, respectively, the average jaw radius.

* * * * *